United States Patent
Lin et al.

(10) Patent No.: US 9,442,351 B2
(45) Date of Patent: Sep. 13, 2016

(54) OPTICAL ENGINE MODULE HAVING HEAT-DISSIPATING MODULE AND PROJECTION APPARATUS HAVING THE SAME

(71) Applicants: Tsung-Ching Lin, Hsin-Chu (TW); Jia-Hong Dai, Hsin-Chu (TW); Tung-Chou Hu, Hsin-Chu (TW)

(72) Inventors: Tsung-Ching Lin, Hsin-Chu (TW); Jia-Hong Dai, Hsin-Chu (TW); Tung-Chou Hu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 7 days.

(21) Appl. No.: 14/329,999

(22) Filed: Jul. 14, 2014

(65) Prior Publication Data
US 2015/0092164 A1    Apr. 2, 2015

(30) Foreign Application Priority Data
Sep. 29, 2013   (CN) .......................... 2013 1 0454807

(51) Int. Cl.
*G03B 21/16* (2006.01)
*G03B 21/20* (2006.01)
*G03B 33/08* (2006.01)

(52) U.S. Cl.
CPC ............. *G03B 21/16* (2013.01); *G03B 21/204* (2013.01); *G03B 33/08* (2013.01)

(58) Field of Classification Search
CPC  G03B 21/16; G03B 21/204; G03B 21/2033; F21V 29/02; F21V 29/006; F21V 29/677; F21V 29/74; G06F 1/201; G06F 1/203
See application file for complete search history.

(56) References Cited

U.S. PATENT DOCUMENTS

| 6,755,554 | B2 | 6/2004 | Ohmae et al. | |
| 7,926,953 | B2 | 4/2011 | Yanagisawa et al. | |
| 9,033,530 | B2* | 5/2015 | Bruemmer | A61B 1/0653 353/31 |
| 2004/0130869 | A1* | 7/2004 | Fleck | G06F 1/203 361/679.26 |
| 2004/0170000 | A1* | 9/2004 | Fujiwara | G06F 1/203 361/719 |

(Continued)

FOREIGN PATENT DOCUMENTS

| CN | 101498887 | 8/2009 |
| CN | 201562114 | 8/2010 |

(Continued)

OTHER PUBLICATIONS

"Office Action of Chinese Counterpart Application", issued on Nov. 25, 2015, p. 1-p. 8, in which the listed reference was cited.

*Primary Examiner* — Sultan Chowdhury
(74) *Attorney, Agent, or Firm* — Jianq Chyun IP Office

(57) ABSTRACT

An optical engine module includes a first casing with a first enclosed space, a light source at the first casing, a phosphor wheel in the first casing, a cooling fan and a heat-dissipating module. The light source emits a light beam passing through the phosphor wheel. The cooling fan is in the first enclosed space and has an airflow outlet. The heat-dissipating module includes two heat-dissipating parts and a heat-guiding part, wherein the first and second heat-dissipating parts are respectively in and outside the first enclosed space, the heat-guiding part is connected between the first and second heat-dissipating parts and the phosphor wheel is between the airflow outlet and the first heat-dissipating part. The airflow outlet and the phosphor wheel, and the phosphor wheel and the first heat-dissipating part, are at least partially overlapped with each other along the airflow exiting direction of the cooling fan.

15 Claims, 5 Drawing Sheets

(56) References Cited

U.S. PATENT DOCUMENTS

| | | | |
|---|---|---|---|
| 2005/0174544 A1* | 8/2005 | Mazzochette | G03B 21/00 353/69 |
| 2007/0091276 A1* | 4/2007 | Zakoji | G03B 21/16 353/54 |
| 2008/0043425 A1* | 2/2008 | Hebert | G06F 1/20 361/679.5 |
| 2012/0013854 A1 | 1/2012 | Nishimura et al. | |
| 2014/0198304 A1* | 7/2014 | Sun | G03B 21/16 353/61 |

FOREIGN PATENT DOCUMENTS

| | | |
|---|---|---|
| CN | 201917768 | 8/2011 |
| CN | 102853377 | 1/2013 |
| CN | 102981233 | 3/2013 |
| JP | 2007310223 | 11/2007 |
| JP | 2007316319 | 12/2007 |
| TW | 322921 | 4/2010 |

* cited by examiner

OPTICAL ENGINE MODULE HAVING HEAT-DISSIPATING MODULE AND PROJECTION APPARATUS HAVING THE SAME

CROSS-REFERENCE TO RELATED APPLICATION

This application claims the priority benefit of China application serial no. 201310454807.8, filed on Sep. 29, 2013. The entirety of the above-mentioned patent application is hereby incorporated by reference herein and made a part of this specification.

BACKGROUND OF THE INVENTION

1. Field of the Invention

The invention generally relates to an optical apparatus, and more particularly, to an optical engine module with heat-dissipating effect.

2. Description of Related Art

Digital light processing (DLP) projection apparatus works based on using an illumination beam emitted from a light source, after being filtered and converted into red, green and blue three color lights (R, G, B) by a color wheel in high-speed rotating, to be transmitted onto a digital micro-mirror device (DMD) to get an imaging beam by converting, followed by projecting the imaging beam onto a screen to form frames with a projection lens. The DMD continuously change the angles thereof, in association with a high-speed rotating color wheel and taking advantage of the human eye's vision persistence effect, a pixel gives out different color variations. In addition, a laser light source could be used to emit a blue light beam, and after the blue light beam excites the phosphor on a phosphor wheel, a red beam and a green beam could be produced as well for getting the imaging beam.

To avoid external dust from depositing on the color wheel to affect the projection quality of the projection apparatus or cause the projection apparatus abnormal working, the color wheel is disposed in an enclosed space formed by a casing in some designs so as to isolate the external dust. However, the heat produced during running the motor of the color wheel is hard to be discharged from the enclosed space, while the light beam with high energy may lead an over heat of the phosphor powder on the color wheel to affect the optical converting efficiency.

US Patent publication No. 2012013854 discloses a dust-proof structure of an optical assembly, where a fan is used to produce an airflow for cooling the color wheel, the motor and the optical channel. U.S. Pat. No. 6,755,554 discloses a color wheel structure, wherein the cover body and the body of the color wheel have cooling fins, and the fins could be heat-dissipated by a cooling fan. China Patent Application No. 2015621140 discloses a projector, where a casing encloses a color wheel, and the casing has a light-passing hole and a transparent substrate to enclose the light-passing hole. U.S. Pat. No. 7,926,953 discloses a projection apparatus, wherein the projection apparatus has a sealed optical assembly, and a cooling apparatus is employed to absorb the heat in the sealed space and discharge the heat out of the sealed space.

SUMMARY OF THE INVENTION

Accordingly, the invention is directed to an optical engine module with good heat-dissipating efficiency.

Other advantages of the invention should be further indicated by the disclosures of the invention, and omitted herein for simplicity.

To achieve one of, a part of or all of the above-mentioned objectives, or to achieve other objectives, an embodiment of the invention provides an optical engine module, which includes a first casing, a light source, a phosphor wheel, a cooling fan and a heat-dissipating module. The first casing has a first enclosed space. The light source is disposed at the first casing. The phosphor wheel is disposed in the first enclosed space, wherein the light source module is configured to emit a light beam passing through the phosphor wheel. The cooling fan is disposed in the first enclosed space and has an airflow outlet, wherein the airflow outlet and the phosphor wheel are at least partially overlapped with each other along the airflow exiting direction of the cooling fan. The heat-dissipating module includes a first heat-dissipating part, a heat-guiding part and a second heat-dissipating part, wherein the first heat-dissipating part is disposed in the first enclosed space, the second heat-dissipating part is disposed outside the first enclosed space, the heat-guiding part is connected between the first heat-dissipating part and the second heat-dissipating part, the phosphor wheel is positioned between the airflow outlet and the first heat-dissipating part, and the phosphor wheel and the first heat-dissipating part are at least partially overlapped with each other along the airflow exiting direction.

Based on the depiction above, the embodiments of the invention at least have one of the following advantages. The first enclosed space of the first casing has the first heat-dissipating part therein in the embodiments of the invention, and the first heat-dissipating part is connected to the second heat-dissipating part outside the first enclosed space via the heat-guiding part. In this way, the heat produced during running the phosphor wheel in the first enclosed space could reach the first heat-dissipating part, followed by transmitting the heat to the second heat-dissipating part outside the first enclosed space via heat-guiding part to properly cool the phosphor wheel. In addition, the phosphor wheel is positioned between the airflow outlet of the cooling fan and the first heat-dissipating part, and the airflow outlet, the phosphor wheel and the first heat-dissipating part are at least partially overlapped with each other along the airflow exiting direction of the cooling fan, which enables the cooling airflow produced by the cooling fan effectively guiding the heat of the phosphor wheel to the first heat-dissipating part to further advance the heat-dissipating efficiency of the optical engine module.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

In order to make the features and advantages of the invention more comprehensible, the invention is further described in detail in the following with reference to the embodiments and the accompanying drawings.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
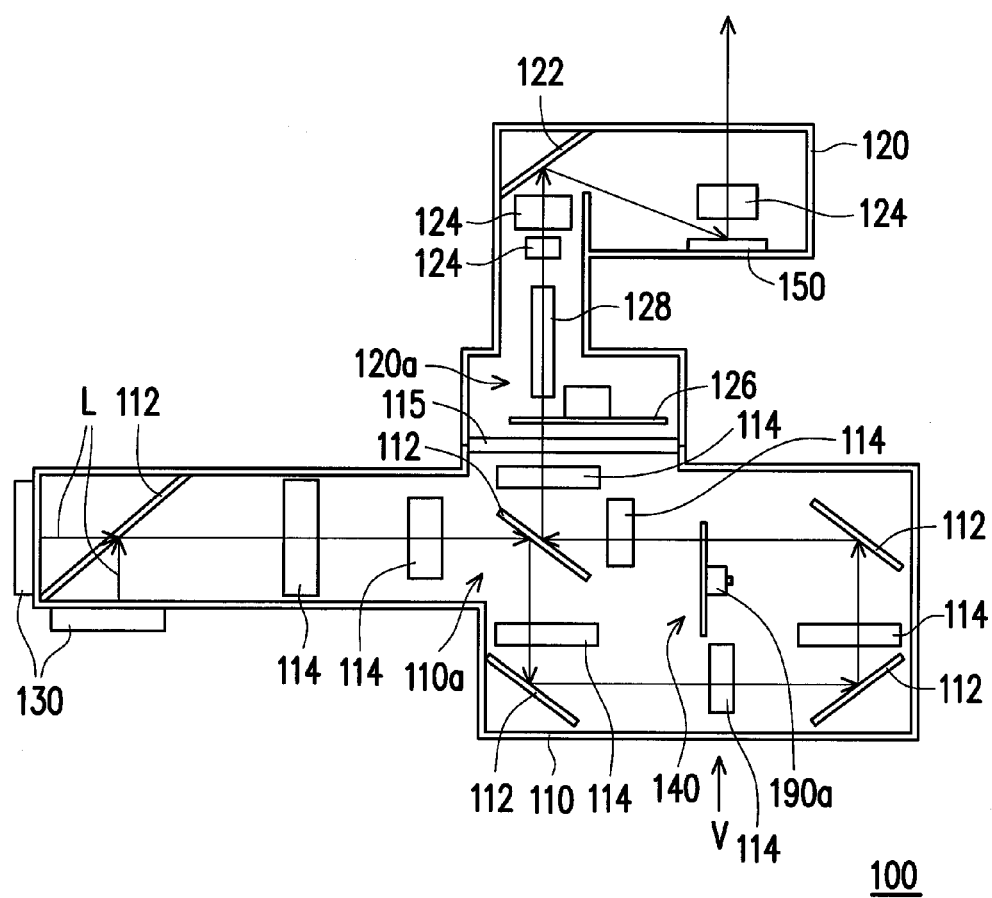
FIG. 1 is a schematic diagram of an optical engine module according to an embodiment of the invention.

FIG. 1 is a schematic diagram of an optical engine module according to an embodiment of the invention. Referring to FIG. 1, an optical engine module 100 of the embodiment is suitable for a projection apparatus and includes a first casing 110, a second casing 120, a light source module 130, a phosphor wheel 140 and a light valve 150. The first casing 110 has a first enclosed space 110a, the light source module 130 is, for example, a laser light source and is disposed at the first casing 110, the phosphor wheel 140 is disposed in the first enclosed space 110a, and the first enclosed space 110a has a light-combining assembly 112 and a plurality of light-guiding assemblies 114 (for example, lenses) therein. Since the phosphor wheel 140 is disposed in the first enclosed space 110a, the external dust is avoided from being adhered on the phosphor wheel 140.

The second casing 120 is connected to the first casing 110 and has a second enclosed space 120a. The second enclosed space 120a has a reflective assembly 122 and a plurality of light-guiding assemblies 124 therein. The light valve 150 is, for example, a DMD assembly (digital micro-mirror device, DMD) and disposed in the second enclosed space 120a. Since the light valve 150 is disposed in the second enclosed space 120a, the external dust is avoided to be adhered on the light valve 150. The light source module 130 is configured to emit a light beam L. In the embodiment, the light source module 130 is a blue laser module to produce a blue laser light beam. The light beam L passes through the light-combining assembly 112 and the light-guiding assemblies 114 to arrive at the phosphor wheel 140. The phosphor wheel 140 includes a light-passing region and at least one wavelength-converting region, in which the light-passing region enables the blue laser light beam passing through, while the wavelength-converting region is configured to convert the blue laser light beam into a red light beam or a green light beam, followed by being reflected towards the light source module 130. The wavelength-converting region of the embodiment could be composed of phosphor powders, which the invention is not limited to. The three color light beams (R, G, B) after travelling through the wavelength-converting region or the light-passing region of the phosphor wheel are further transmitted towards the light valve 150, by which the light beam L is converted into an imaging beam.

Figure 2:
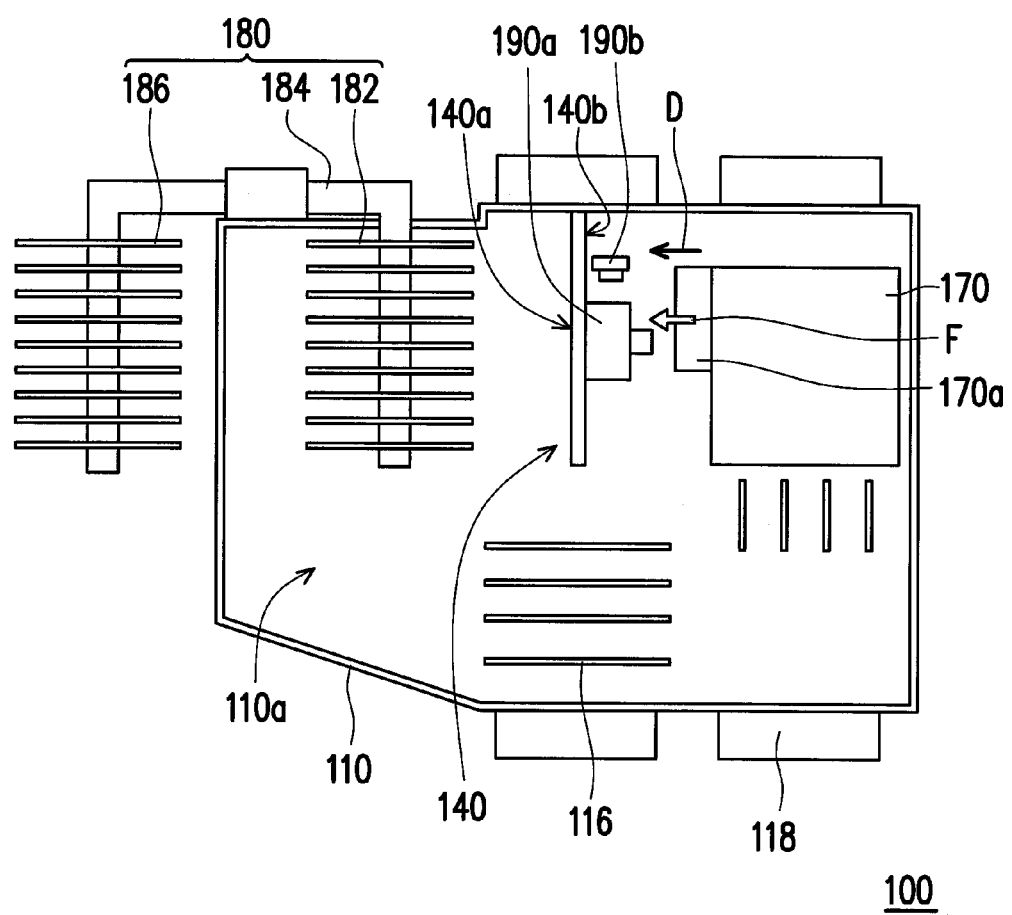
FIG. 2 is a diagram showing partial parts of the optical engine module in FIG. 1 in an angle of view V.

FIG. 2 is a diagram showing partial parts of the optical engine module in FIG. 1 in an angle of view V. For better understanding, a cooling fan 170, a heat-dissipating module 180, a motor 190a, a light sensor 190b, a first heat-dissipating fins set 116 and a second heat-dissipating fins set 118 in FIG. 2 are not shown in FIG. 1. Referring to FIG. 2, the optical engine module 100 of the embodiment further includes a cooling fan 170 and a heat-dissipating module 180. The cooling fan 170 is disposed in the first enclosed space 110a of the first casing 110 and has an airflow outlet 170a. The heat-dissipating module 180 includes a first heat-dissipating part 182, a heat-guiding part 184 and a second heat-dissipating part 186, in which the first heat-dissipating part 182 is, for example, a heat-dissipating fins set and is disposed in the first enclosed space 110a; the second heat-dissipating part 186 is, for example, a heat-dissipating fins set and is disposed outside the first enclosed space 110a; the heat-guiding part 184 is connected between the first heat-dissipating part 182 and the second heat-dissipating part 186. The phosphor wheel 140 is positioned between the airflow outlet 170a and the first heat-dissipating part 182. The airflow outlet 170a and the phosphor wheel 140 are at least partially overlapped with each other along the airflow exiting direction D of the cooling fan 170, meanwhile, the phosphor wheel 140 and the first heat-dissipating part 182 are at least partially overlapped with each other along the airflow exiting direction D.

Under the above-mentioned layout, during running the phosphor wheel 140 in the first enclosed space 110a the heat produced by the phosphor wheel 140 would, along with the heat-dissipating airflow F, reach the first heat-dissipating part 182, and then, is transmitted to the second heat-dissipating part 186 outside the first enclosed space 110a via the heat-guiding part 184 so as to properly bring the heat produced by the phosphor wheel 140 out of the first enclosed space 110a. In addition, since the phosphor wheel 140 is located between the airflow outlet 170a of the cooling fan 170 and the first heat-dissipating part 182, and the airflow outlet 170a, the phosphor wheel 140 and the first heat-dissipating part 182 are at least partially overlapped with each other along the airflow exiting direction D, thus, the heat-dissipating airflow F produced by the cooling fan 170 could effectively guide the heat produced by the phosphor wheel 140 to the first heat-dissipating part 182. In the embodiment, the actual testing result on the heat-dissipating module 180 used in a projection system is shown by Table 1. It could be seen from Table 1 that the heat-dissipating module could reduce the air temperature in the first enclosed space by 20° C. or so, while the temperature of the phosphor powder on the phosphor wheel could be reduced by 30° C. or so. In addition, the frame luminance of the projection system is advanced by 5%, and the temperatures of the light sensor on the phosphor wheel and the motor could be reduced by 15° C. or so, so that the heat-dissipating module 180 further advances the heat-dissipating efficiency of the optical engine module 100.

TABLE 1

| | Testing Result | |
|---|---|---|
| | With the heat-dissipating module | Without the heat-dissipating module |
| Air temperature in the first enclosed space | 57° C. | 77° C. |

Referring to FIG. 2, in more details, the phosphor wheel 140 of the embodiment has a front surface 140a and a back surface 140b opposite to each other. The front surface 140a is, for example, spread with phosphor powder and configured to be excited by the light beam L from the light source module 130 (shown in FIG. 1) to produce light beams with different colors. The back surface 140b is made of, for example, metal, and the motor 190a and the light sensor 190b are disposed at the back surface 140b, in which the motor 190a is for driving the phosphor wheel 140 and the light sensor 190b is for sensing the rotating position of the phosphor wheel 140. The front surface 140a and the back surface 140b of the phosphor wheel 140 respectively face the first heat-dissipating part 182 and the airflow outlet 170a so that the heat-dissipating airflow F produced by the cooling fan 170 could directly blow the motor 190a and the metallic portion of the back surface 140b of the phosphor wheel so as to effectively cool the motor 190a and, by means of the high thermal conduction efficiency of the metallic portion, to quickly bring out the heat of the phosphor wheel 140. In the embodiment, the phosphor wheel 140 could be a transparent phosphor wheel or a reflective phosphor wheel. So-called transparent phosphor wheel in the current technique means the phosphor powder is spread on a transparent substrate, so that the color light produced after exciting the phosphor powder has the same transmission direction as the exciting beam; the reflective phosphor wheel means the phosphor powder is spread on a substrate able to reflect the light beam, so that the color light produced after exciting the phosphor powder has the transmission direction opposite to the exciting beam.

Referring to FIG. 2 again, in the embodiment, the optical engine module 100 further includes a plurality of first heat-dissipating fins sets 116 and a plurality of second heat-dissipating fins sets 118. The first heat-dissipating fins sets 116 are connected to the first casing 110 and positioned in the first enclosed space 110a, and the second heat-dissipating fins sets 118 are connected to the first casing 110 and positioned outside the first enclosed space 110a, so that the heat in the first enclosed space 110a could be transmitted to the second heat-dissipating fins sets 118 outside the first enclosed space 110a through the first heat-dissipating fins sets 116 and the first casing 110 for cooling.

Referring to FIG. 1, the optical engine module 100 of the embodiment further includes a light-transmitting assembly 115 and a plurality of optical assemblies. The optical assemblies include, for example, a color filter wheel 126 and a light integration rod 128. The light-transmitting assembly 115 is disposed between the first casing 110 and the second casing 120 to separate the first enclosed space 110a from the second enclosed space 120a. The color filter wheel 126 and the light integration rod 128 are disposed in the second enclosed space 120a of the second casing 120. The color light beams produced by the phosphor wheel 140 are configured to reach the second enclosed space 120a from the first enclosed space 110a through the optical assemblies 115 and also configured to reach the light valve 150 after sequentially passing through the color filter wheel 126 and the light integration rod 128.

By disposing the color filter wheel 126 and the light integration rod 128 in the second enclosed space 120a, it could be avoided the external dust is adhered at the color filter wheel 126 and the light integration rod 128 to lower down the optical efficiency and affect the luminance of the projection system. In addition, the first enclosed space 110a and the second enclosed space 120a not communicated with each other in the optical engine module 100 through the first casing 110, the second casing 120 and the optical assemblies 115 could avoid all the assemblies of the optical engine module 100 from being positioned in a single enclosed space to make the heat over-concentrated, which advances the heat-dissipating efficiency of the optical engine module 100.

Figure 2A:
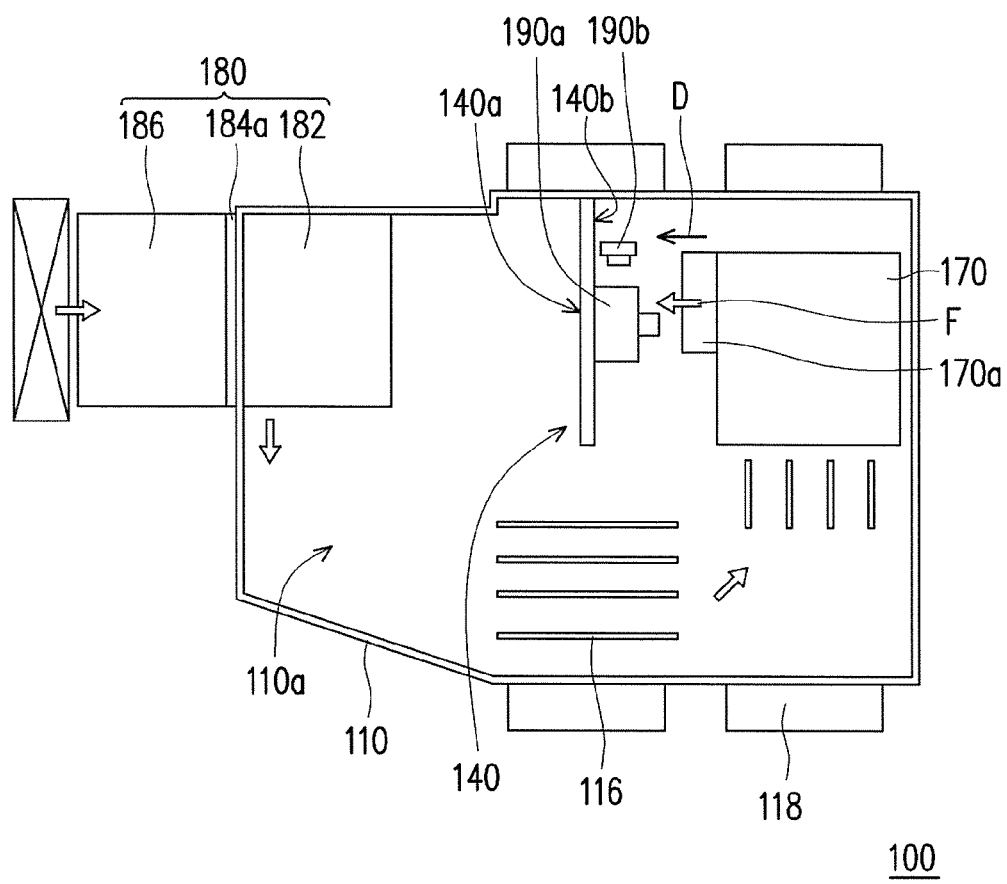

In the embodiment, the first casing 110 is made of, for example, aluminium, while the heat-guiding part 184 is, for example, a heat pipe or a thermoelectric cooling chip (TEC chip). As shown in FIG. 2A, a thermoelectric cooling chip 184a with two surfaces respectively facing the first heat-dissipating part 182 and the second heat-dissipating part 186, is connected between the first heat-dissipating part 182 and the second heat-dissipating part 186, wherein the surface facing the first heat-dissipating part 182 of the thermoelectric cooling chip 184a is a cold surface and the surface facing the second heat-dissipating part 186 of the thermoelectric cooling chip 184a is a hot surface. The high thermal conduction efficiency of the heat pipe enables transmitting the heat in the first enclosed space 110a quickly to outside through the heat-guiding part 184. In other embodiments, the heat-guiding part 184 could be a graphite sheet or other members having a high thermal conduction efficiency, which the invention is not limited to.

Figure 3:
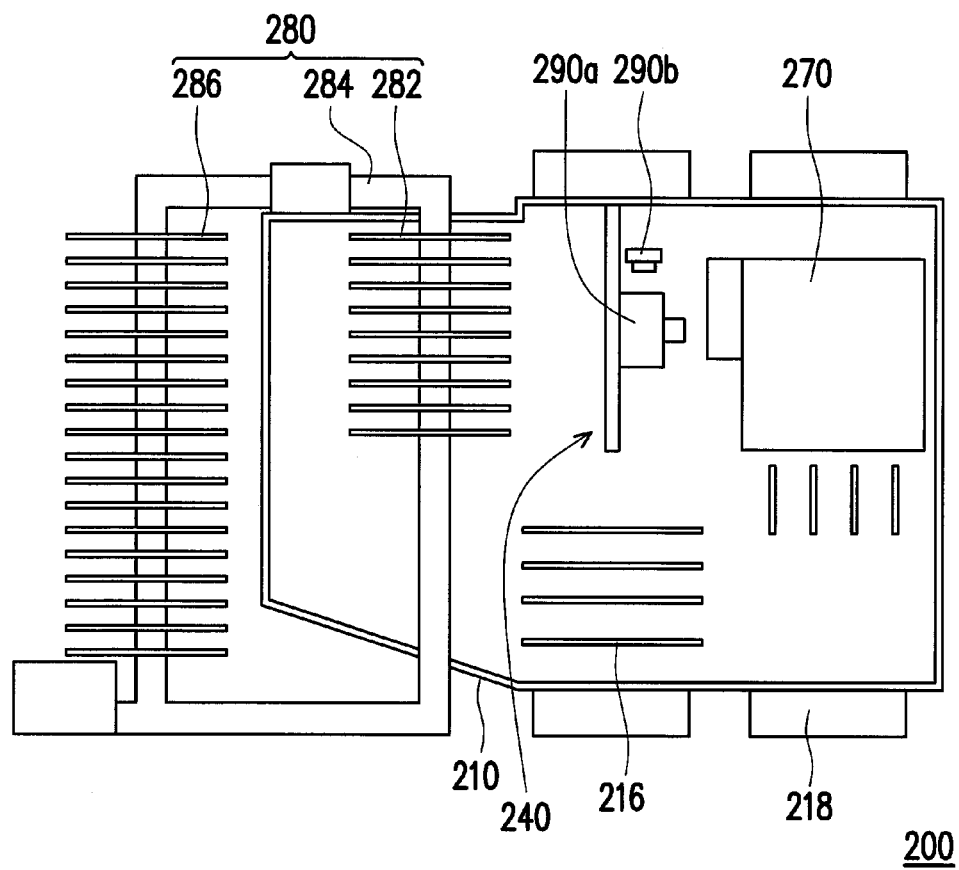
FIG. 3 is schematic diagram showing partial parts of an optical engine module according to another embodiment of the invention.

FIG. 3 is schematic diagram showing partial parts of an optical engine module according to another embodiment of the invention. In the optical engine module 200 of FIG. 3, the layout of a first casing 210, a phosphor wheel 240, a cooling fan 270, a first heat-dissipating part 282, a second heat-dissipating part 286, a motor 290a and a light sensor 290b is similar to the layout of the first casing 110, the phosphor wheel 140, the cooling fan 170, the first heat-dissipating part 182, the second heat-dissipating part 186, the motor 190a and the light sensor 190b in FIG. 2, which is omitted to describe. The difference of the optical engine module 200 from the optical engine module 100 rests in that the heat-guiding part 284 of the heat-dissipating module 280 is a loop-type heat pipe so as to increase the thermal exchanging efficiency.

Figure 4:
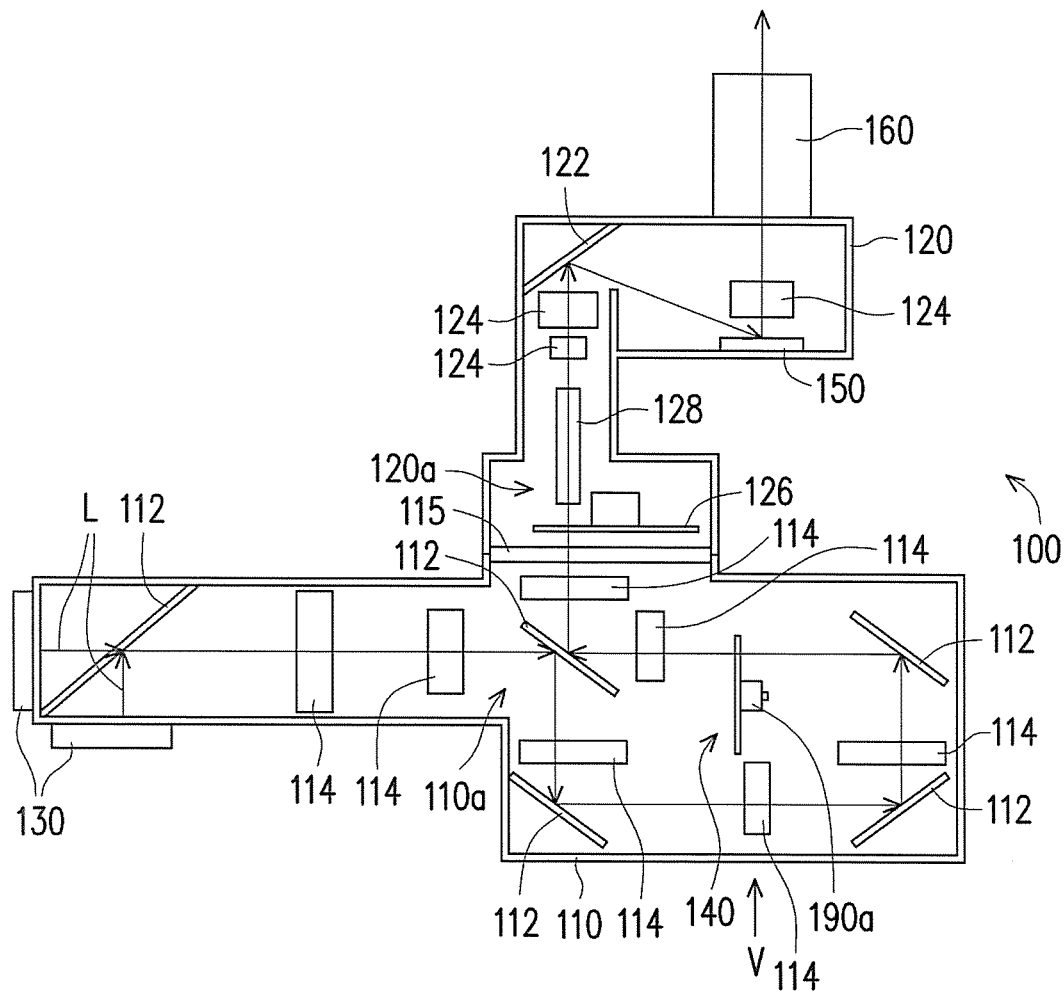
FIG. 4 is a schematic diagram of a projection apparatus according to an embodiment of the invention.

FIG. 4 is a schematic diagram of a projection apparatus according to an embodiment of the invention. Referring to FIG. 4, the projection apparatus of the invention includes a optical engine module 100 of FIG. 1 and further a projection lens 160. The projection lens 160 is used to project the imaging light beam converted and produced by the light valve 150 in the optical engine module 100 of FIG. 1 onto a screen (not shown).

In summary, the embodiments of the invention at least have one of the following advantages. The first enclosed space of the first casing has the first heat-dissipating part therein in the embodiments of the invention, and the first heat-dissipating part is connected to the second heat-dissipating part outside the first enclosed space via the heat-guiding part. In this way, the heat produced during running the phosphor wheel in the first enclosed space could reach the first heat-dissipating part, followed by transmitting the heat to the second heat-dissipating part outside the first enclosed space to reduce the air temperature in the first enclosed space and further reduce the temperature of the phosphor powder on the phosphor wheel. In addition, the phosphor wheel and the light sensor are positioned in the first enclosed space, which could achieve the purpose of the dustproof. Moreover, the phosphor wheel is positioned between the airflow outlet of the cooling fan and the first heat-dissipating part, and the airflow outlet, the phosphor wheel and the first heat-dissipating part are at least partially overlapped with each other along the airflow exiting direction of the cooling fan, which enables the cooling airflow produced by the cooling fan effectively guiding the heat produced by the phosphor wheel to the first heat-dissipating part to effectively cool the phosphor wheel, the motor and the light sensor. In addition, the first enclosed space and the second enclosed space are not communicated with each other in the optical engine module through the first casing, the second casing and the optical assemblies could avoid all the assemblies of the optical engine module from being positioned in a single enclosed space to make the heat over-concentrated, which further advances the heat-dissipating efficiency of the optical engine module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Each of the terms "first", "third", and "fourth" is only a nomenclature used to modify its corresponding elements. These terms are not used to set up the upper limit or lower limit of the number of elements. Moreover, no element and component in the present disclosure is intended to be dedicated to the public regardless of whether the element or component is explicitly recited in the following claims.

What is claimed is:

1. An optical engine module, comprising:
    a first casing, having a frame body and a first enclosed space within in the frame body;
    a light source module, disposed at the first casing;
    a phosphor wheel, disposed in the first enclosed space, wherein the light source module is configured to emit a light beam irradiating the phosphor wheel;
    a cooling fan, disposed in the first enclosed space and having an airflow outlet blowing air to the phosphor wheel, wherein the airflow outlet and the phosphor wheel are at least partially overlapped with each other along an airflow exiting direction of the cooling fan, and the airflow outlet is disposed in the first enclosed space and not disposed at the frame body; and
    a heat-dissipating module, comprising a first heat-dissipating part, a heat-guiding part and a second heat-dissipating part, wherein the first heat-dissipating part is disposed in the first enclosed space, the second heat-dissipating part is disposed outside the first enclosed space, the heat-guiding part is connected between the first heat-dissipating part and the second heat-dissipating part, the phosphor wheel is positioned between the airflow outlet and the first heat-dissipating part, and the phosphor wheel and the first heat-dissipating part are at least partially overlapped with each other along the airflow exiting direction.

2. The optical engine module as claimed in claim 1, wherein the phosphor wheel is a transparent phosphor wheel or a reflective phosphor wheel.

3. The optical engine module as claimed in claim 2, wherein the phosphor wheel has a front surface and a back surface, and the front surface and the back surface respectively face the first heat-dissipating part and the airflow outlet.

4. The optical engine module as claimed in claim 3, wherein the material of the phosphor wheel at the back surface comprises metal.

5. The optical engine module as claimed in claim 3, further comprising a motor disposed at the back surface.

6. The optical engine module as claimed in claim 1, further comprising at least one first heat-dissipating fins set, wherein the first heat-dissipating fins set is connected to the first casing and positioned in the first enclosed space.

7. The optical engine module as claimed in claim 1, further comprising at least one second heat-dissipating fins set, wherein the second heat-dissipating fins set is connected to the first casing and positioned outside the first enclosed space.

8. The optical engine module as claimed in claim 1, further comprising:
    a second casing, connected to the first casing and having a second enclosed space;

a plurality of optical assemblies, disposed in the second enclosed space; and a light valve, disposed in the second enclosed space.

9. The optical engine module as claimed in claim 8, wherein the optical assemblies comprise a color filter wheel and a light integration rod both disposed on a transmission path of the light beam.

10. The optical engine module as claimed in claim 8, further comprising a light-transmitting assembly disposed between the first casing and the second casing to separate the first enclosed space and the second enclosed space from each other, wherein the light beam is configured to arrive at the second enclosed space from the first enclosed space via the light-transmitting assembly.

11. The optical engine module as claimed in claim 1, wherein the heat-guiding part is a heat pipe.

12. The optical engine module as claimed in claim 1, wherein the heat-guiding part is a loop-type heat pipe.

13. The optical engine module as claimed in claim 1, wherein the heat-guiding part is a thermoelectric cooling chip.

14. The optical engine module as claimed in claim 1, wherein the light source module is a laser light source.

15. A projection apparatus, comprising:

a first casing, having a frame body and a first enclosed space within in the frame body;

a light source module, disposed at the first casing;

a phosphor wheel, disposed in the first enclosed space, wherein the light source module is configured to emit a light beam passing through the phosphor wheel;

a cooling fan, disposed in the first enclosed space and having an airflow outlet blowing air to the phosphor wheel, wherein the airflow outlet and the phosphor wheel are at least partially overlapped with each other along an airflow exiting direction of the cooling fan, and the airflow outlet is disposed in the first enclosed space and not disposed at the frame body; and a heat-dissipating module, comprising a first heat-dissipating part, a heat-guiding part and a second heat-dissipating part, wherein the first heat-dissipating part is disposed in the first enclosed space, the second heat-dissipating part is disposed outside the first enclosed space, the heat-guiding part is connected between the first heat-dissipating part and the second heat-dissipating part, the phosphor wheel is positioned between the airflow outlet and the first heat-dissipating part, and the phosphor wheel and the first heat-dissipating part are at least partially overlapped with each other along the airflow exiting direction; and a second casing, connected to the first casing and having a second enclosed space;

a plurality of optical assemblies, disposed in the second enclosed space;

a light valve, disposed in the second enclosed space; and a projection lens, disposed at the second casing for projecting an imaging light beam converted and obtained from the light valve.

\* \* \* \* \*